(12) United States Patent
Meter

(10) Patent No.: US 10,251,372 B2
(45) Date of Patent: Apr. 9, 2019

(54) ACCOMMODATION FOR CHICKEN

(75) Inventor: Tjitze Meter, Veenendaal (NL)

(73) Assignee: HatchTech Group B.V., Veenendaal (NL)

(*) Notice: Subject to any disclaimer, the term of this patent is extended or adjusted under 35 U.S.C. 154(b) by 514 days.

(21) Appl. No.: 13/642,838

(22) PCT Filed: Apr. 20, 2010

(86) PCT No.: PCT/NL2010/050208
§ 371 (c)(1),
(2), (4) Date: Jan. 8, 2013

(87) PCT Pub. No.: WO2011/133021
PCT Pub. Date: Oct. 27, 2011

(65) Prior Publication Data
US 2013/0125826 A1 May 23, 2013

(51) Int. Cl.
| A01K 31/19 | (2006.01) |
| A01K 39/00 | (2006.01) |
| A01K 39/012 | (2006.01) |
| A01K 39/014 | (2006.01) |

(52) U.S. Cl.
CPC .............. *A01K 31/19* (2013.01); *A01K 39/00* (2013.01); *A01K 39/012* (2013.01); *A01K 39/014* (2013.01)

(58) Field of Classification Search
CPC ...... A01K 31/18; A01K 31/22; A01K 31/002; A01K 31/17; A01K 39/00; A01K 39/01; A01K 39/012; A01K 39/0125; A01K 39/014; A01K 39/06; A01K 5/00; A01K 5/02; A01K 5/0225; A01K 5/0233; A01K 5/0291; A01K 31/19

USPC ................... 119/302, 456, 475–479
See application file for complete search history.

(56) References Cited

U.S. PATENT DOCUMENTS

| 2,137,996 | A |   | 11/1938 | Crawford |
| 2,630,098 | A |   | 3/1953 | Waniewski et al. |
| 2,631,567 | A | * | 3/1953 | Gilson ............................ 119/53 |
| 2,791,199 | A |   | 5/1957 | Hamnett |
| 2,997,021 | A |   | 8/1961 | Bailey |
| 3,035,920 | A |   | 5/1962 | Knodt |
| 3,038,443 | A |   | 6/1962 | Miller |
| 3,099,980 | A | * | 8/1963 | Merkle ................ A01K 39/012 |
|           |   |   |         | 119/53.5 |

(Continued)

FOREIGN PATENT DOCUMENTS

| EP | 1 104 987 B1 | 3/2004 |
| FR | 1468142 A | 2/1967 |

(Continued)

OTHER PUBLICATIONS

U.S. Appl. No. 13/642,480, US 2013-0104809.

(Continued)

*Primary Examiner* — Joshua D Huson
(74) *Attorney, Agent, or Firm* — N.V. Nederlansch Octrooibureau; Catherine A. Shultz

(57) ABSTRACT

This invention relates to a method for promoting growth of young chicken comprising the step;
offering feed in a layered manner in subsequent order of pellet-size for adjusting the pellet-size to the size of the young chicken during a whole brooding cycle for the feed being attractive during the whole brooding cycle as perceived by the young chicken.

17 Claims, 6 Drawing Sheets

(56) References Cited

U.S. PATENT DOCUMENTS

| | | | |
|---|---|---|---|
| 3,225,740 A | 12/1965 | Orr, Jr. | |
| 3,233,590 A * | 2/1966 | Venca | 119/51.5 |
| 3,240,000 A | 3/1966 | Hayes et al. | |
| 3,396,702 A | 8/1968 | Trussell | |
| 3,396,703 A | 8/1968 | Trussell | |
| 3,492,970 A * | 2/1970 | Siciliano et al. | 119/475 |
| 3,742,912 A * | 7/1973 | Chen et al. | 119/51.03 |
| 3,776,190 A * | 12/1973 | Hurlbert | 119/478 |
| 3,820,507 A | 6/1974 | Dugan et al. | |
| 3,900,008 A * | 8/1975 | Jinnette | 119/51.13 |
| 3,970,044 A * | 7/1976 | Peppler et al. | 119/475 |
| 4,378,758 A | 4/1983 | Coleman | |
| 4,606,299 A | 8/1986 | Grumbach | |
| 4,628,864 A * | 12/1986 | Smeltzer | 119/51.04 |
| 4,862,831 A | 9/1989 | Graham | |
| 4,972,802 A * | 11/1990 | Huddleston et al. | 119/51.04 |
| 5,513,597 A * | 5/1996 | Pollock | 119/57.4 |
| 5,657,720 A | 8/1997 | Walters | |
| 5,709,167 A | 1/1998 | Kelley | |
| 5,718,628 A | 2/1998 | Nakazato et al. | |
| 6,708,755 B1 | 3/2004 | Meter | |
| 7,861,673 B2 | 1/2011 | Huisinga et al. | |
| 8,272,352 B2 | 9/2012 | Hendel | |
| 2004/0028115 A1 | 2/2004 | Meter | |
| 2007/0245973 A1 | 10/2007 | Huisinga et al. | |
| 2007/0286913 A1* | 12/2007 | Swain | A61K 36/48 424/738 |
| 2010/0186428 A1* | 7/2010 | Meter | 62/62 |
| 2011/0000437 A1 | 1/2011 | Meter | |
| 2011/0094452 A1 | 4/2011 | Huisinga et al. | |

FOREIGN PATENT DOCUMENTS

| | | |
|---|---|---|
| RU | 2373702 C1 | 11/2009 |
| WO | WO-99/11145 A1 | 3/1999 |
| WO | WO-00/08922 A1 | 2/2000 |
| WO | WO-02/39812 A1 | 5/2002 |
| WO | WO-2004/047527 A1 | 6/2004 |
| WO | WO-2005/070198 A1 | 8/2005 |
| WO | WO-2007/142511 A1 | 12/2007 |
| WO | WO-2009/014422 A1 | 1/2009 |
| WO | WO-2009/116851 A1 | 9/2009 |

OTHER PUBLICATIONS

U.S. Appl. No. 13/642,483, US 2013-0092094.
U.S. Appl. No. 12/919,464, US 2011-0000437.
Craig, et al. "Recommended methods for the preconditioning of Odourous air prior to treatment in organic biofilters", NCEA, Feb. 24, 2004, 19 pgs.
International Search Report in PCT/NL2008/050111 dated Feb. 4, 2009.
International Search Report in PCT/NL2010/050203 dated Feb. 16, 2011.
International Search Report in PCT/NL2010/050210 dated Dec. 29, 2010.
International Search Report for PCT/NL2010/050208—dated Dec. 27, 2010.
S. Cerrate et al., "Effect of pellet diameter in broiler starter diets on subsequent performance", Department of Poultry Science, University of Arkansas, Fayetteville 72701, 2009 J. Appl. Poult. Res. 18 :590-597.

* cited by examiner

ACCOMMODATION FOR CHICKEN

BACKGROUND

The present invention relates to a method of promoting growth and welfare of young chicken.

SUMMARY OF THE INVENTION

The invention aims to provide an improved method for promoting growth of young chicken.

According to a first aspect of the invention this is realized with a method for promoting growth of young chicken comprising the step;

offering feed in a layered manner in subsequent order of pellet-size for adjusting the pellet-size to the size of the young chicken during a whole brooding cycle for the feed being attractive during the whole brooding cycle as perceived by the young chicken.

The offering feed in a layered manner in subsequent order of pellet-size ensures that the feed is attractive for the young chicken during the whole brooding cycle because first the smaller pellet-size is offered to the young chicken and subsequently the pellet-size grows along with the young chicken.

In an embodiment of the method according to the invention, the method comprises the step;

providing a trough provided with subsequent layers of feed in subsequent order of pellet-size.

Providing the subsequent layers in a trough makes the method even more suitable for young chicks, renders the feeding process more controllable and prevents waste of feed.

In an embodiment of the method according to the invention, the method comprises the step;

filling of the trough only once during a brooding cycle.

Filling the trough only once during a brooding cycle renders the brooding process more economical and controllable since less intervention is required.

In an embodiment of the method according to the invention, the method comprises the steps;

providing a lighting device for illuminating the young chicken while offering feed, Illuminating the young chicken with a lighting intensity within the range of 80 to 100 lux, specifically about 90 lux, more specifically 90 lux.

Illuminating the young chicken with a lighting intensity of about 90 lux surprisingly promotes growth of the young chicken.

In an embodiment of the method according to the invention, the method comprises the step;

providing the trough in a crate for accommodating a group of young chicken, wherein the group consists of 40 to 60 young chicken, specifically about 50 young chicken, more specifically 50 young chicken.

Accommodating a group of young chicken in a crate, wherein the group consists of about 50 young chicken surprisingly promotes growth of the young chicken. The group size of about 50 turned out to be an optimal group size which is on the one hand economical feasible and on the other hand is small enough for the young chicken to familiarize. Moreover, the method of promoting growth is more predictable and manageable in a relative small group of young chicken.

In an embodiment of the method according to the invention, the method comprises the step;

providing the layers comprising different type of food.

Different type of food in the layers ensures the young chicken receive the nutrition's they need during the whole brooding cycle. In this connection, different type of food means a variation in the composition of the food. The composition of the food in the different layers differ in share of substances such as protein, fats, cellulose, calcium, phosphor, lysine and vitamins.

According to a further aspect of the invention this is realized with feed for poultry, specifically young chicken, in a climate chamber, wherein the feed comprises a binder for preventing pulverising of the feed.

The feed comprising a binder for preventing pulverising of the feed lowers the amount of dust and fine particles, which is important in connection with the closed environment created by the climate chamber. Moreover the binder prevents waist of feed, which is very important in connection. An example of a binder is a layer around the pellet, wherein the layer comprises fat, specifically wherein the layer is a fatty layer for guaranteeing the integrity of the pellet.

According to a further aspect of the invention this is realized with a system of a trough and feed, preferably feed according to the invention, wherein the feed is provided in the trough in a layered manner, wherein subsequent layers are arranged in order of pellet-size for adjusting the pellet-size to the size of the young chicken during a whole brooding cycle for the feed being attractive during the whole brooding cycle as perceived by the young chicken.

According to a further aspect of the invention this is realized with a crate for young chicken, wherein the crate comprises one or more systems of trough and feed according to the invention.

According to a further aspect of the invention this is realized with a climate chamber comprising a crate according to the invention, preferably a stack of crates.

Both the crate and the climate chamber with heat exchangers as well as the trough are described in WO-2009/014422 by applicant HATCHTECH GROUP B.V., which application is considered comprised in the content of this application as filed by reference.

The invention further relates to a device comprising one or more of the characterising features described in the description and/or shown in the attached drawings.

The invention further relates to a method comprising one or more of the characterising features described in the description and/or shown in the attached drawings.

The various aspects discussed in this patent can be combined in order to provide additional advantageous advantages.

DESCRIPTION OF THE DRAWINGS

The present invention in particular uses a climate chamber or incubator chamber, also disclosed in WO-2009/014422, in particular suitable for the current invention and described in the FIGS. 1-7a & 8. The present invention will be described below in more detail with reference to an example illustrated diagrammatically in the drawings, in which:

FIG. 7b show a trough of the crate of 7a.

DETAILED DESCRIPTION OF EMBODIMENTS

Figure 7A:
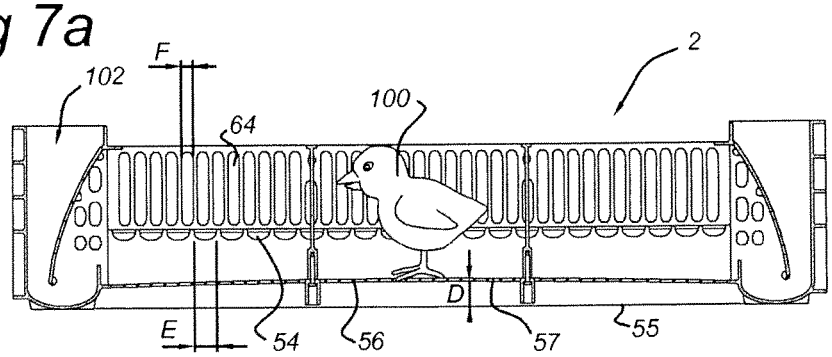
FIG. 7a shows a first vertical view in longitudinal section of the crate from FIG. 6, which view in longitudinal section is taken along arrows VII in FIG. 6.

In the FIG. 7a in a cross sectional side view a crate 2 is shown with a trough 102 for poultry, such as young chicken 4.

Figure 7B:
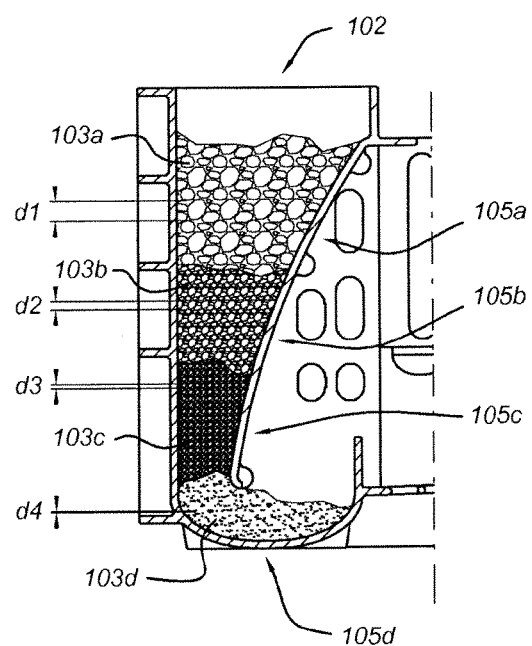

FIG. 7b shows a detail of FIG. 1a with the trough 102 with feed 103a, 103b, 103c, 103d. The feed is provided in different layers 105a, 105b, 105c, 105d. Here, each layer extends substantially horizontal in the trough 102, preferably completely within the trough 102. Two subsequent layers 105a, 105b, 105c, 105d comprise feed with different pellet-size d1, d2, d3, d4. Here, each layer comprises feed with different pellet-size d1, d2, d3, d4. The pellet-size d1, d2, d3, d4 increases with the height level of the layer 105a, 105b, 105c, 105d in the trough 102 such that the pellet-size d1, d2, d3, d4 of the feed that is offered to the young chicken 104 grows along with the chicken. Thus the feed 103e in the layer 105c has a pellet-size d3 which is greater than the pellet-size d4 of the feed 103d in the layer 105d, and so forth. Here d4 is about 2 mm in diameter the pellet has a length of about 5 mm. The pellet-size increases stepwise with about 1 mm in diameter and length up to the pellet-size in layer 105a having a diameter d1 of 5 mm and a length of 8 mm of the pellet. Here the number of layers 105a, 105b, 105c, 105d is four which simplifies the filling of the trough 102 and still is effective to promote growth of the young chicken in combination with filling the trough 102 only once during a brooding cycle. The number of layers is preferably <6 for simplifying the filling of the trough 102. The trough 102 has a volume such that the trough, or troughs, 102 need to be filled only once in a brooding cycle. Thus the trough 102 contains all the feed 103a, 103b, 103c, 103d the young chicken 100 need. A brooding cycle means the life of a young chicken between day zero until for example day four of its life. The end of the cycle differs with the type of young chicken between day 3 up to about one week. The brooding cycle aims at keeping the young chicken in its optimal temperature zone during their first days.

Figure 6:
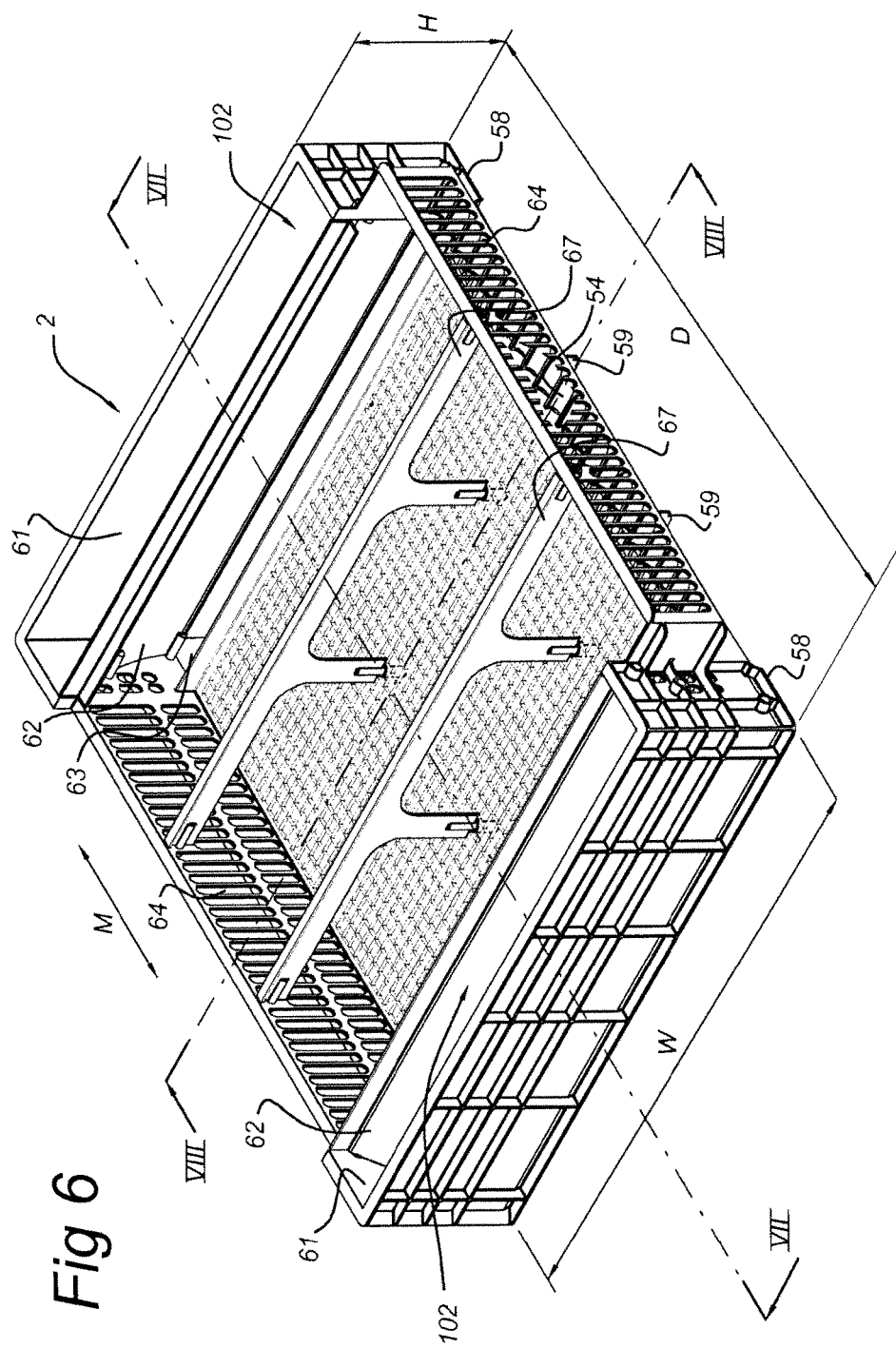
FIG. 6 shows a perspective view of a crate from the stack of crates as illustrated in FIG. 3.

FIG. 6 shows in a perspective view the crate 2 of FIG. 7a, provided with two troughs 102 at two opposite sides of the crate 2. The crate 2 has dimensions W, D, H such that a group of young chicken can be bred within the crate, wherein the group consists of about 50 young chicken. Here the crate 2 offers a room for living for the chicken of about 60×60×13 cm. The young chicken 100 need to have their vital necessities, such as feed, water, light and fresh air, within a radius of between of about 25 cm up to about 50 cm to promote growth of the young chicken 100.

Figure 3:
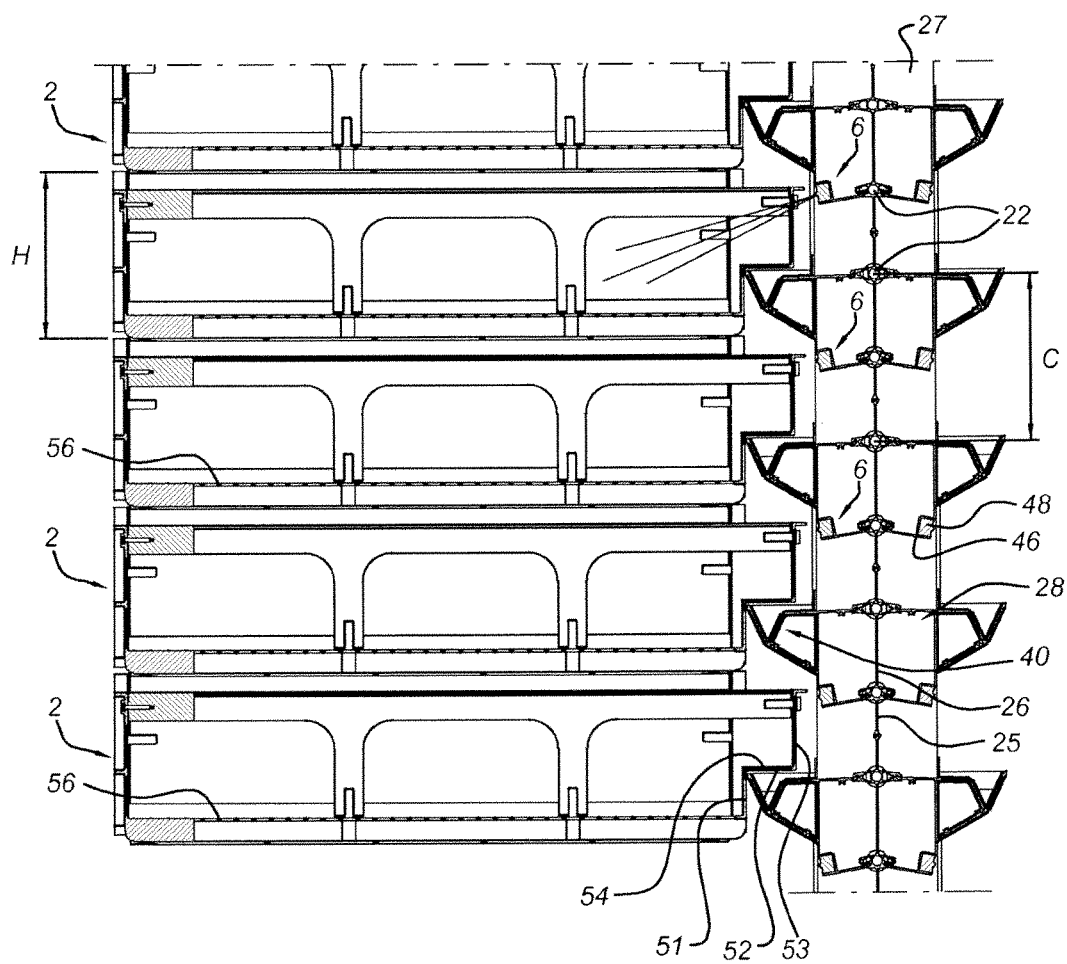
FIG. 3 shows a cross-sectional side view of a part of the heat exchanger from FIG. 1 together with part of a stack of crates.

FIG. 3 shows a stack of crates 2 situated in a climate chamber (partly shown). Here, the lighting devices 6 are provided with a wall of the climate chamber such that each crate 2 can be individually illuminated for illuminating the young chicken 100. The young chicken are illuminated with a lighting intensity of about 90 lux which surprisingly promoted growth of the young chicken 4. The lighting devices 6 are arranged such that the maximum possible distance between a young chicken 100 and a lighting device is <about 50 cm, which surprisingly promotes welfare and growth of the young chicken 100.

The present invention is in particular suitable for a climate chamber or incubator chamber, also disclosed in WO-2009/014422, and described below.

Figure 1:
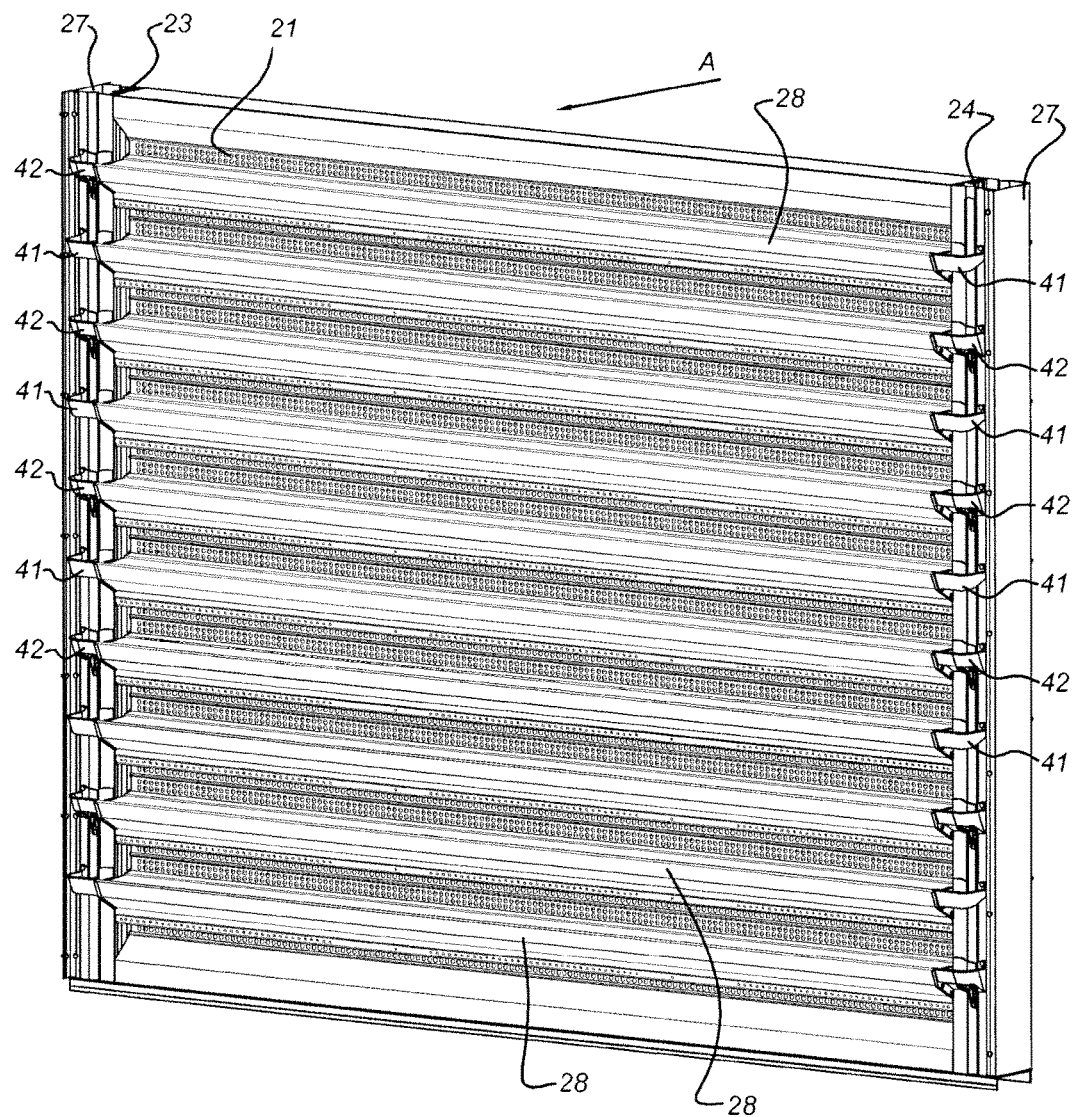
FIG. 1 shows a perspective view of a heat exchanger according to the invention.
Figure 2:
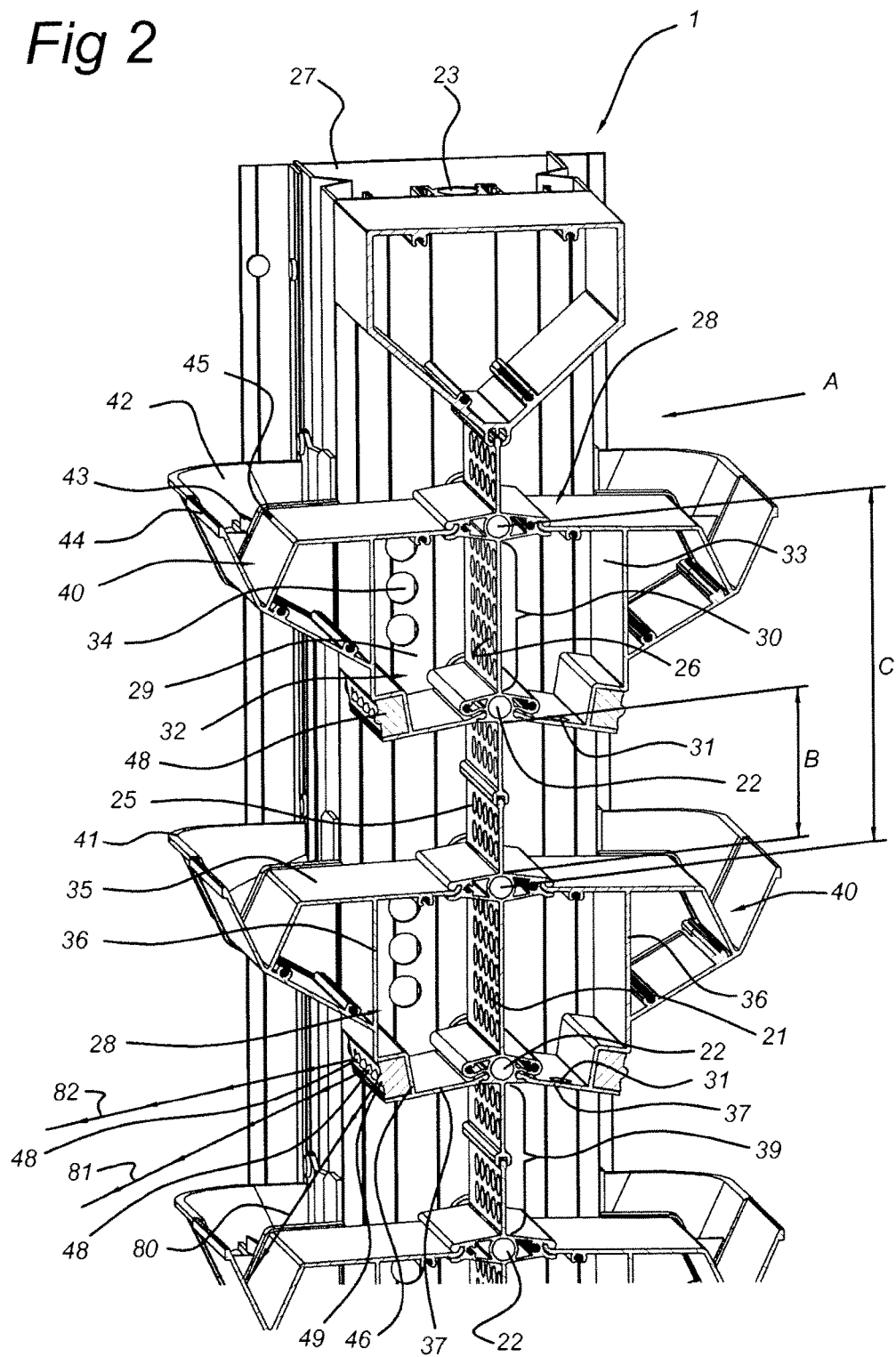
FIG. 2 shows a cross-sectional perspective view of a part of the heat exchanger from FIG. 1.

FIGS. 1, 2 and 3 show a heat exchanger for use in a climate chamber. This heat exchanger is constructed around a panel-shaped body 21 having one or more fluid lines 22. The panel-shaped body 21 is provided with perforations 25 and 26. These perforations make it possible for a gas stream (arrow A) to pass through the panel-shaped body 21 in a direction transverse to the panel-shaped body 21. Similarly to a radiator, the panel-shaped body 21 can be brought to a specific temperature by means of the fluid flowing through the one or more fluid lines. The one or more fluid lines extend between a feed line and a discharge line for said fluid. The panel-shaped body and the fluid lines will usually be made of a metal and form an integral part of one another (for example by being welded to one another, soldered to one another or by extruding the lines and the body in a single operation to form a single extrusion profile). Such a heat exchanger, as described above with reference to FIGS. 1, 2 and 3, can also be seen in FIGS. 3 and 4 of WO 00/08922. This (known) heat exchanger is additionally provided, in particular, with gassing ducts 28.

The gassing ducts 28 run parallel to one another and along the panel-shaped body 21. The gassing ducts 28 are fed by one or more medium supply ducts 27 and are connected thereto by passage openings 34. As can be seen in FIG. 1, a tubular medium supply duct 27 is provided along opposite sides of the panel-shaped body 21 so that the gassing ducts 28 can be supplied with medium from two sides simultaneously. The gassing ducts 28 extend between the latter and transversely to the medium supply ducts 27. The gassing ducts 28 are provided at a centre-to-centre distance C from one another in such a manner that in each case one intermediate zone 39 of the panel-shaped body 21 remains clear between two gassing ducts 28 situated one above the other. The height B of this intermediate zone 39 may be, for example, 7 to 10 cm, such as approximately 8.5 cm in this embodiment. The gas stream A can pass through the panel-shaped body 21 via the perforations 25 in this intermediate zone 39.

Each gassing duct 28 has an interior 29 which is delimited by a top wall 35, a bottom wall 37 and two side walls 36. The panel-shaped body 21 in each case extends with a part 30 through the gassing duct 28, which part forms a partition, as it were, which divides the gassing duct 28 into a first duct compartment 32 and a second duct compartment 33. Both compartments extend along the entire length of the gassing duct 28 and are in this case of equal size and shape. However, the duct compartments do not have to be of equal size and shape. It is also conceivable for there to be only one compartment if the panel-shaped body delimits a side wall of the gassing duct, for example, if the part 30 has been cut away, for example, or if the gassing duct has been placed against or close to the panel-shaped body on the outside of the panel-shaped body.

In order to ensure that the medium supplied via the gassing ducts 28 flows out along the panel-shaped body 21, distributed in the surrounding area, in particular the gas stream directed transversely to the panel-shaped body 21, each gassing duct 28 is provided with outflow openings 31 arranged over the length of said gassing duct in a distributed manner. By varying the size of these outflow openings 31 and/or the distance between adjacent outflow openings 31, an even delivery along the entire length of the gassing duct 28 can be achieved. In the embodiment illustrated in FIGS. 1, 2 and 3, in each case only the second duct compartment 33 is provided with outflow openings 31 and the first duct compartment is substantially closed, except for the passage openings 34 and the perforations 26. This offers the advantage that the medium supplied spreads along the length of the gassing duct in the first compartment while, in the meantime, the temperature is influenced (that is to say is increased or reduced) by the temperature of the part 30 of the panel-shaped body, which part acts as a partition, then flows to the second compartment via the perforations 26 in said part 30 which act as a partition, while, in the meantime, the temperature of the medium is influenced again, and then flows to the outflow openings via the second compartment, while the temperature of the medium is in this case too influenced again in the meantime.

The medium supply ducts 27 are provided along opposite edges of the panel-shaped body 21 and attached thereto. Thus, the heat exchanger can be produced as a modular unit, of which only the two medium supply ducts have to be connected upon installation. Furthermore, the feed line 23 and discharge line 24 for fluid are accommodated inside the medium supply ducts. In practice, this can be achieved relatively easily without the dimensions of the medium supply ducts having to increase substantially. After all, the fluid will generally be a fluid such as water, so that these lines 23 and 24 can be relatively small, compared to the supply duct for gaseous medium. Another advantage is the fact the medium supply duct thus protects the line 23 and/or 24 against damage and that the temperature of the medium can be influenced, if desired—by heating or cooling by means of the line 23 and/or 24—while it is flowing through the medium supply duct.

As can be seen in FIGS. 2 and 3, the interior 29 of each gassing duct 28 touches the exterior 38 of a fluid line 22, both at the top wall 35 and at the bottom wall 37. This improves the exchange of heat between the fluid and the medium.

According to a further embodiment, each gassing duct 28 of the heat exchanger 1 is provided with a trough 40 having a first end 41 and a second end 42. These troughs 40 can be used for moisturization by filling them with a liquid, in particular water, and allowing it to evaporate. When used in a climate chamber containing birds, these troughs 40 can also be used as drinking troughs. In order to simplify the filling of the troughs 40 with liquid, the latter are in particular provided with an overflow 43 near the second end, and the troughs are staggered one above the other, in each case with the second end 42 of a trough 40 situated at a higher level above the first end 41 of a trough 40 situated at a lower level. The liquid can then be supplied at the first end 41 of the top trough, will then fill the top trough up to the filling level determined by the overflow, subsequently fill the trough situated underneath up to the filling level determined by the overflow thereof, etcetera, until the bottom trough is also filled. In order to ensure that the liquid flows to each subsequent trough and to prevent flooding, in case there is an obstacle in one trough, the first longitudinal top trough edge 44 is higher than the second longitudinal top trough edge 45, which is closer to the panel-shaped body 21, and the top wall 35 of the gassing duct 28 in each case continues up to the second longitudinal top trough edge 45. The liquid can then pass the obstacle via the top wall 35.

Referring to FIGS. 2 and 3, each gassing duct is furthermore provided, if desired, with a fastening means, such as a receiving slot 46, for attaching a lighting fixture 47 (illustrated only in FIG. 2). This fixture 47 is provided with a row comprising a plurality of lighting LEDs 48, 49 (LED=light-emitting diode). Here, several LEDs 49 are in each case directed towards the trough 40 underneath (directional arrow 80 in FIG. 2) in order to illuminate the latter. The applicant has found that if the troughs 40 are drinking troughs for poultry, in particular for chicks, it is advantageous if these LEDs emit red light. The birds can then easily find the drinking trough. Other LEDs 48 may be directed in various directions (directional arrows 81 and 82 in FIG. 2) in order to ensure even illumination and prevent blinding the birds.

The heat exchanger 1 can be used in a climate chamber in an advantageous manner, in particular in a climate chamber for rearing animals, in particular very young animals, such as chicks less than 4 days old or of an age of 0 or 1 days. Such very young animals, such as in particular chicks, are not yet able to control their own body temperature very well. In order to rear them well, it is important that they are kept at a predetermined temperature, which is dependent on the type of animal, in particular during the initial phase after hatching (birth), and to control this temperature very accurately (that is to say with an accuracy of $\pm 1°$ C., preferably with an accuracy of $\pm 0.5°$ C., or with a greater accuracy, such as $\pm 0.2°$ C. or less). The term climate chamber is particularly understood to mean a device having an interior space, which can control the temperature in and throughout this interior space with an accuracy of $\pm 1°$ C., preferably with an accuracy of $\pm 0.5°$ C., or with a greater accuracy, such as $\pm 0.2°$ C. or less (that is to say, the greatest difference in temperature between two spots in said space will be at most the value of said 'accuracy'). Controlling the temperature with such accuracy is also often desirable when ripening fruit, hatching eggs and with other temperature-dependent processes. In that case, a climate chamber is used, the walls of which are insulated and in the interior of which a certain desired climatized environment can be maintained.

Figure 4:
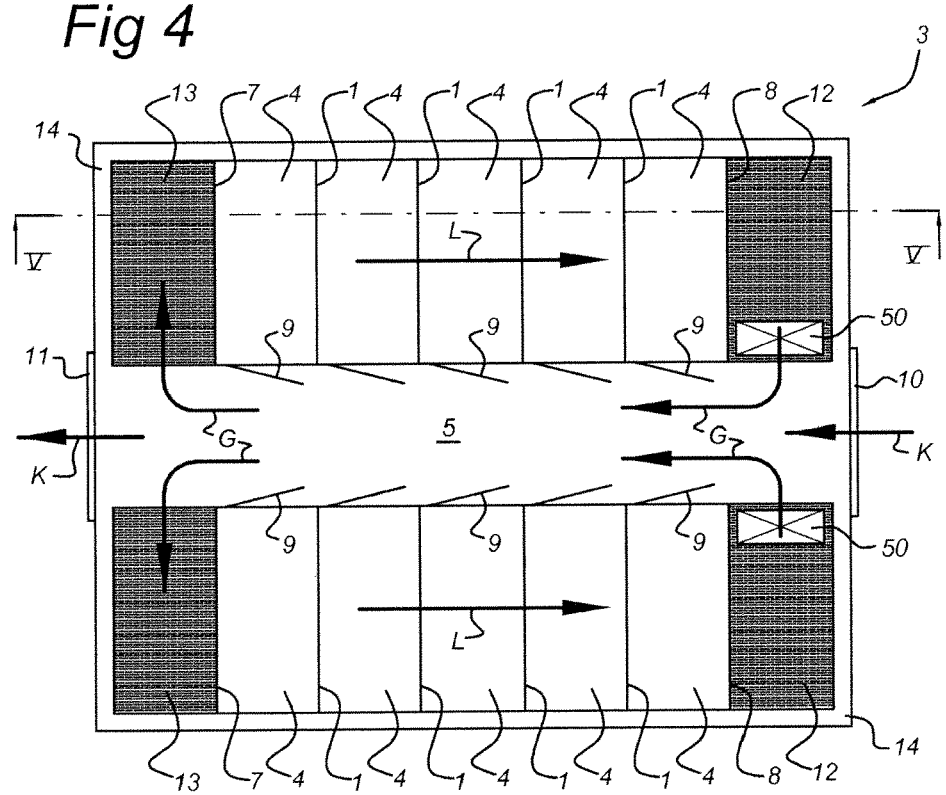
FIG. 4 shows a highly diagrammatic top view of a climate chamber according to the invention.
Figure 5:
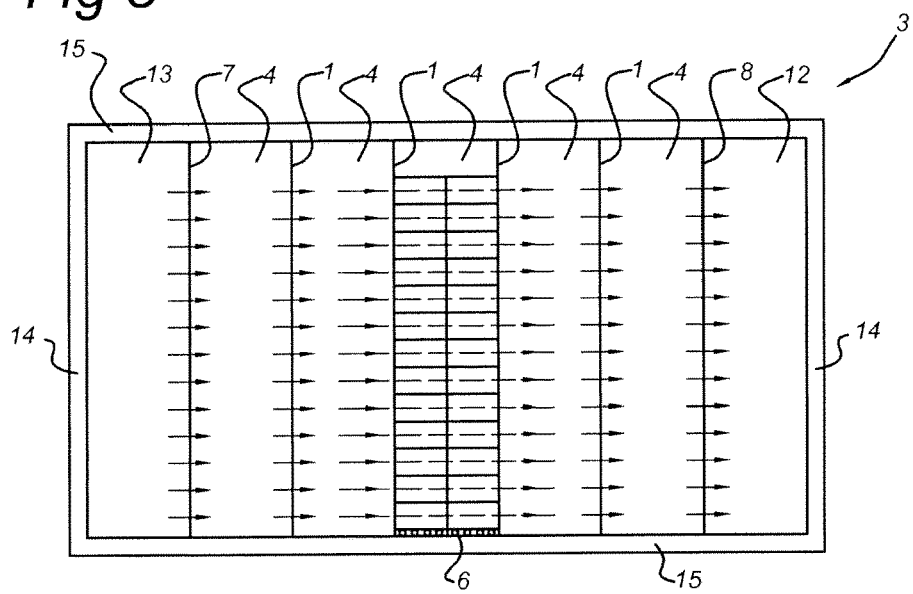
FIG. 5 shows a vertical view in longitudinal section of the climate chamber according to FIG. 4, which view in longitudinal section is taken along arrows V in FIG. 4.

FIGS. 4 and 5 highly diagrammatically show such a climate chamber 3, which in this case is in particular intended for rearing chicks which have just hatched. This climate chamber is delimited on the outside by thermally insulated side walls 14, a thermally insulated ceiling 16 and a floor 15, which is preferably also thermally insulated. The climate chamber 3 has at least one chamber compartment 4 in which the young chicken are kept or stored under conditioned circumstances, such as chicks, is placed. In the illustrated example, there are two rows with five chamber compartments 4 each. The rows are on either side of a corridor 5 and are accessible from the corridor 5 via doors 9. Entering and exiting the climate chamber 3 is possible by means of at least one door 10, 11. In this example, a door 10 is provided at one end of the corridor, which is intended in particular for entering the corridor 5 of the climate chamber, and a door 11 is provided at the other end which is intended in particular for exiting the corridor 5 of the climate chamber.

At one end of each row of chamber compartments 4 an inlet chamber 13 is in each case provided for introducing conditioned gas, such as air, into the upstream chamber compartment 4, and an outlet chamber 13 is in each case provided at the other end of each row of chamber compartments 4 for collecting gas coming from the downstream chamber compartment 4. Although it is not required, it is energetically advantageous subsequently to feed the gas from the outlet chamber 13 back to the inlet chamber. The gas may be fed back along the top of the chamber compartments, as is illustrated in WO 00/08922. However, this method requires a lot of space and it is more advantageous to feed the gas back via the corridor 5, as is indicated in FIG. 4 by means of arrows G. This leads to a significant reduction in the amount of space required. In addition, another result thereof is that the corridor 5 is also conditioned, albeit slightly less well than the chamber compartments 3, so that it is possible to open the door 9 of a chamber compartment during use while causing minimal disturbance to the climate.

In FIG. 4, the conveying stream of the products to be treated in the climate chamber, such as chicks, is indicated by means of arrows K. The products are preferably discharged via door 11 and the products are preferably supplied via door 10, 11 since the supply side can thus be kept relatively clean, which prevents contamination.

The chamber compartments of this climate chamber are provided with heat exchangers at opposite sides. The inflow side of the chamber compartment which is most upstream is in each case delimited by a heat exchanger 7, the outflow side of the most downstream chamber compartment is in each case delimited by a heat exchanger 8 and adjacent chamber compartments are in each case delimited with respect to one another by a heat exchanger 1. These heat exchangers 1, 7 and 8 may be substantially identical with respect to one another, but given the fact that the heat exchangers 7 and 8 only delimit a chamber compartment on one side, it will be clear to those skilled in the art that these heat exchangers 7 and 8 may also be of a different design, in particular on the side which is remote from the chamber compartment 4. The heat exchangers 1, 7 and 8 are of the kind which are composed of a panel-shaped body 21 provided with perforations 25 and 26, as well as with fluid lines 22. The gas stream through the chamber compartments and the perforations in the panel-shaped body 21 are in this case indicated by means of arrows L. Ventilation means 50, such as fans, in this case ensure that the gas stream is maintained. These ventilation means may as such be provided at various locations, but will usually be provided in the inlet chamber 12 and/or the outlet chamber 13.

As stated above, the climate chamber 3 is in particular provided with heat exchangers 1, 7 and 8 as described in various further embodiments with reference to FIGS. 1, 2 and 3. 1, 2, 3 or more rows 6 of stacked crates 2 are placed in each chamber compartment. In particular, this will be 1 or 2 rows of stacks, such as two rows 6 of stacks, as illustrated diagrammatically in the central chamber compartment in FIG. 5. Depending on the depth, viewed at right angles to the plane of the drawing from FIG. 5, of each chamber compartment 4 and the length, viewed in the direction of double arrow M from FIG. 6, each row 6 of stacks of crates may comprise one or more stacks of crates.

Referring to FIGS. 6, 7, 8 and FIG. 3, if the heat exchangers 1, 7 and 8 are provided with drinking troughs 40, each crate preferably has a height H corresponding to the centre-to-centre distance C between the gassing ducts 28 and drinking troughs 40. Furthermore, the crate 2 is then provided with drinking passages 54 on one side, the side facing the drinking trough 40, so that the birds, in particular the chicks, can drink from a trough 40. These drinking passages 54 may be provided in a vertical side wall of the crate. However, it is particularly advantageous to provide that side of the crate 2 facing the drinking trough with, starting from the bottom, a bottom vertical wall part 51, a wall part 52 which is directed outwards from the top of the bottom vertical wall part 51, and a top wall part 53 which is directed vertically from the outer edge of the outwardly directed wall part 52. The outwardly directed wall part 52 of each crate 2 is in each case situated above a trough 40 and is provided with the drinking passages 54 which continue as far as just into the bottom vertical wall part 51 to increase drinking comfort. These drinking passages 54 are, on the one hand, dimensioned such that the birds can drink from the trough, but, on the other hand, cannot escape from the crate 2 via the drinking passage 54. The width E of the drinking passages is in this case approximately 22 mm, so that the chicks can stick their head through them, but their body is too large to pass through them. The bottom vertical wall part 51 forms a kind of railing which prevents the chicks from pushing each other as far as above the trough and ensures a correct drinking level. As an indication, for chicks of chickens, the bottom vertical wall part 51 may, in this case, have a height of approximately 50 mm to 55 mm and the top vertical wall part 53 may in this case have a height of approximately 90 mm to 110 mm.

In order to ensure that the gas stream A can permeate the crate 2, the crate 2 is provided with ventilation openings on two opposite sides—which are at right angles to the gas stream A—in order to allow the gas stream A to pass. These ventilation passages have a width F, see FIG. 7, which is such that the animals, in particular the chicks, cannot escape through them. The width F is preferably such that the animals cannot stick their head out of the crate here.

In order to be able to feed the animals, such as the abovementioned chicks, the crate 2 is provided with a feeding trough 60. In order to allow the gas to flow through the crate 2 in a manner which is as unimpeded as possible, this feeding trough 60 is provided along a side of the crate 2 which is at right angles to the side along which the drinking trough 40, at least the drinking passages 54, are provided. The feeding trough 60 comprises, in a known manner, a partition 62 which separates the filling opening 61 from the feed opening 63 which is situated at a lower level.

Figure 8:
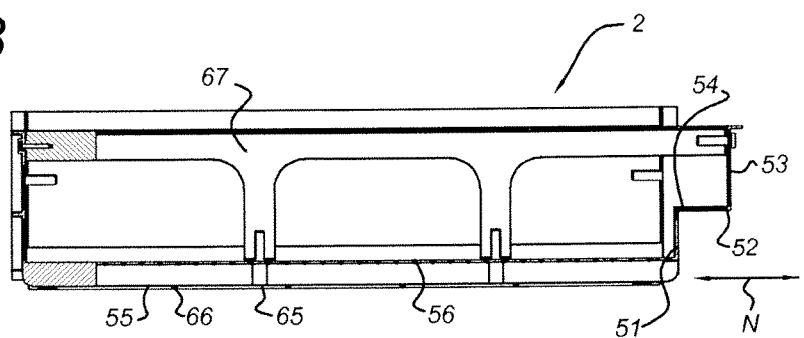
FIG. 8 shows a second vertical view in longitudinal section of the crate from FIG. 6, which view in longitudinal section is taken along arrows VIII in FIG. 6.

The bottom of the crates is designed as a grate 56 with a removable baseplate 55 fitted underneath. This baseplate is advantageously made of a material containing cellulose, such as cardboard. The baseplate 55 can then be recycled and be disposed of together with the droppings as a disposable product. More generally, it is advantageous if the baseplate is made from a biodegradable material, such as a biodegradable plastic or biodegradable cardboard. This baseplate 55 is in particular provided at a distance D of 5 mm to 50 mm underneath the grate 56. Referring to FIG. 8, this baseplate 55 can be placed in the crate and removed from the crate by sliding in accordance with the double arrow N. To this end, the crate 2 is provided with two ribs 65 and 66 on the underside, between which there is a slot in which the opposite edges of the baseplate can be accommodated. When stacked, the supports 67 of a crate 2 underneath in each case provide support to the baseplate 55 of a crate 2 above. The underside of the grate is particular designed to be convex towards the top. In order to be able to move this crate 2 safely over a conveyor belt without a baseplate 55 but with chicks 100 or other animals without damaging the legs or toes of the animals, it is advantageous if the crate 2 is provided on the underside with supporting feet 58, which ensure that there is a minimum distance D of 5 to 15 mm between the underside of the grate 56 and the surface. In order to prevent the grate from sagging, it is provided with reinforcing ribs 59 on the underside. It should be noted that a stack of crates for young animals, such as chicks, described in this paragraph, is advantageous by itself: Stack comprising a plurality of crates, optionally containing animals, such as chicks, each crate having a bottom which is designed as a grate 56 having a removable baseplate 55 fitted underneath for collecting droppings.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A method for promoting growth of one or more young chickens during a whole duration of a brooding cycle, the method comprising:
    filling a trough with a plurality of young chicken feed types arranged in a plurality of layers comprising at least three layers, wherein each subsequent layer comprises feed type that increase stepwise in size from the bottommost layer to the topmost layer,
    wherein the trough comprises a feeding portion and a layer holding portion, wherein the feeding portion is configured to expose the young chicken feed type in the bottommost layer to the one or more young chickens for eating and the layer holding portion is configured to hold the plurality of layers and move the plurality of layers toward and into the feeding portion as the one or more young chickens eat the young chicken feed type in the feeding portion, and wherein the layer holding portion comprises a horizontal diameter that increases over a height of the layer holding portion from a bottom of the layer holding portion to a top of the layer holding portion, such that a single filling of the trough is sufficient to provide the required nutrition for the whole duration of a brooding cycle.

2. The method according to claim 1, further comprising: providing a lighting device configured to illuminate the young chicken.

3. The method according to claim 2, wherein the lighting device has a lighting intensity within the range of 80 to 100 lux.

4. The method according to claim 3, wherein the lighting device has a lighting intensity of about 90 lux.

5. The method according to claim 1, wherein the trough is provided in a crate configured to accommodate a group of young chicken.

6. The method according to claim 5, wherein the group consists of 40 to 60 young chicken.

7. The method according to claim 6, wherein the group consists of about 50 young chicken.

8. The method of claim 1, wherein the bottommost layer comprises feed type of about 2 mm in diameter and about 5 mm in length pellet size.

9. The method of claim 8, wherein each subsequent layer comprises feed type that increases stepwise in size of about 1 mm in diameter and about 1 mm in length from the bottommost layer to the topmost layer.

10. The method of claim 1, wherein a vertical cross-sectional area of the layer holding portion is curved.

11. A system comprising
    a) a trough comprising a feeding portion and a layer holding portion;
    b) a plurality of young chicken feed types, which are arranged in the trough in a plurality of layers comprising at least three layers, wherein each layer corresponds to a feed type of the plurality of young chicken feed types, wherein each subsequent layer comprises feed type that increases stepwise in size from the bottommost layer to the topmost layer,
    wherein the feeding portion is configured to expose the young chicken feed type in the bottommost layer to one or more chickens for eating and the layer holding portion is configured to hold the plurality of layers and move the plurality of layers toward and into the feeding portion as the one or more young chickens eat the young chicken feed type in the feeding portion, and wherein the layer holding portion comprises a horizontal diameter that increases over a height of the layer holding portion from a bottom of the layer holding portion to a top of the layer holding portion, and
    wherein the plurality of layers are configured to provide a necessary amount of feed to the one or more young chickens during a whole brooding cycle.

12. The system of claim 11, wherein the layer holding portion is open at a top.

13. The system of claim 11, wherein said at least three layers correspond to at least three feed types of said plurality of young chicken feed types.

14. The system of claim 11, further comprising a plurality of troughs arranged in a plurality of crates configured to accommodate a group of young chickens.

15. The system of claim 11, wherein the bottommost layer comprises feed type of about 2 mm in diameter and about 5 mm in length pellet size.

16. The system of claim 15, wherein each subsequent layer comprises feed type that increases stepwise in size of about 1 mm in diameter and about 1 mm in length from the bottommost layer to the topmost layer.

17. The system of claim 11, wherein a vertical cross-sectional area of the layer holding portion is curved.

* * * * *